(12) United States Patent
Mann et al.

(10) Patent No.: US 7,757,378 B1
(45) Date of Patent: Jul. 20, 2010

(54) RESIN IMPREGNATION PROCESS WITH ENHANCED FLUIDIC CONTROL

(75) Inventors: Kimberly C. Mann, Worcester, MA (US); Sonia Marrero, Longmont, CO (US); Michael C. Strzepa, Shrewsbury, MA (US)

(73) Assignee: Maxtor Corporation, Scotts Valley, CA (US)

( * ) Notice: Subject to any disclaimer, the term of this patent is extended or adjusted under 35 U.S.C. 154(b) by 0 days.

(21) Appl. No.: 11/458,036

(22) Filed: Jul. 17, 2006

Related U.S. Application Data (60) Provisional application No. 60/700,150, filed on Jul. 18, 2005, provisional application No. 60/700,151, filed on Jul. 18, 2005.

(51) Int. Cl.
*G11B 33/02* (2006.01)
*H05K 5/04* (2006.01)

(52) U.S. Cl. ............... 29/603.03; 118/429; 137/599.14; 210/167.01; 210/167.31; 210/172.1; 210/196; 210/340; 427/295; 361/679.33

(58) Field of Classification Search ................ 29/460, 29/603.03; 118/429; 427/294, 295; 137/545, 137/599.14; 210/167.01, 172.1, 194, 196, 210/340, 167.31; 361/679.33
See application file for complete search history.

(56) References Cited

U.S. PATENT DOCUMENTS

| | | | |
|---|---|---|---|
| 3,190,445 A * | 6/1965 | Rosaen | ................ 210/117 |
| 4,384,014 A * | 5/1983 | Young | ................ 427/294 |
| 5,282,100 A | 1/1994 | Tacklind et al. | |
| 5,454,157 A | 10/1995 | Ananth et al. | |
| 5,666,243 A | 9/1997 | Brent | |
| 5,784,296 A | 7/1998 | Baker et al. | |
| 6,075,089 A | 6/2000 | Jaeger et al. | |
| 6,178,059 B1 | 1/2001 | Frees | |
| 6,222,375 B1 | 4/2001 | Fitzpatrick et al. | |
| 6,392,838 B1 | 5/2002 | Hearn et al. | |
| 6,567,235 B2 | 5/2003 | Kasetty et al. | |
| 6,631,053 B1 | 10/2003 | Chew | |
| 6,644,362 B2 | 11/2003 | Bernett | |
| 6,646,821 B2 | 11/2003 | Bernett et al. | |
| 6,678,102 B1 | 1/2004 | Liikanen et al. | |
| 6,683,747 B2 | 1/2004 | Bernett | |
| 6,765,379 B1 | 7/2004 | Marshall et al. | |
| 6,819,517 B2 | 11/2004 | Fioravanti et al. | |
| 6,831,811 B1 | 12/2004 | Andrikowich et al. | |

(Continued)

FOREIGN PATENT DOCUMENTS

GB     1547801 A   *   6/1979

OTHER PUBLICATIONS

Savarese, T.G. And Treseder, R.C.; IBM Corp., "Seal for a Hermetically Sealed Disk File," IBM Technical Disclosure Bulletin, vol. 27, No. 11 (Apr. 1985).

*Primary Examiner*—A. Dexter Tugbang
*Assistant Examiner*—Livius R Cazan
(74) *Attorney, Agent, or Firm*—Fellers, Snider, et al.

(57) ABSTRACT

The present invention relates to a method of sealing disk drive housing castings and the resulting housings. More specifically, as sealant is transferred between a sealant storage tank and an autoclave, the sealant is filtered to remove debris or other impurities from the sealant. By filtering a sealant, multiple casting treatment cycles can be performed using the same sealant without the quality of the sealant suffering.

14 Claims, 9 Drawing Sheets

U.S. PATENT DOCUMENTS

| | | |
|---|---|---|
| 7,023,655 B2 | 4/2006 | Smith |
| 7,062,387 B1 | 6/2006 | Burns et al. |
| 7,218,473 B2 | 5/2007 | Bernett et al. |
| 2003/0172520 A1 | 9/2003 | Liu et al. |

* cited by examiner

Fig. 9 — PLC CONTROLLED CONTINUOUS PROCESSING (WITH ALTERNATE STEP TO ADD SEALANT WHEN REQUIRED)

| Sequence | V1 | V2 | V3 | V4 | V5 | V6 | V7 | MV1 | MV2 | MV3 | MV4 | MV5 | MV6 | MV7 | MV8 | MV9 | MV10 | MV11 | MV12 |
|---|---|---|---|---|---|---|---|---|---|---|---|---|---|---|---|---|---|---|---|
| A | O | O | C | C | C | C | C | O | C | C | C | C | C | O | O | O | O | O | C |
| B | O | O | O | C | O | C | C | O | C | C | C | C | C | O | O | O | O | O | C |
| C | C | C | O | O | C | C | O | O | O | O | O | C | C | O | O | O | O | O | C |
| D | C | C | C | O | O | C | C | O | O | O | O | C | C | O | O | O | O | O | C |
| E | C | C | C | O | O | O | C | O | O | O | O | C | C | O | O | O | O | O | C |
| F | C | O | C | O | C | C | O | O | O | O | O | C | C | O | O | O | O | O | C |
| G | C | O | O | C | O | C | C | O | O | O | O | C | C | O | O | O | O | O | C |
| H | C | C | O | C | C | O | C | O | O | O | O | C | C | O | O | O | O | O | C |

Fig. 10 — PLC CONTROLLED MODERATELY DELAYED (SHORT-TERM STANDBY) PROCESSING (WITH ALTERNATE STEP FOR CYCLE DELAY)

| Sequence | V1 | V2 | V3 | V4 | V5 | V6 | V7 | MV1 | MV2 | MV3 | MV4 | MV5 | MV6 | MV7 | MV8 | MV9 | MV10 | MV11 | MV12 |
|---|---|---|---|---|---|---|---|---|---|---|---|---|---|---|---|---|---|---|---|
| A | O | O | C | C | C | C | C | O | C | C | C | C | C | O | O | O | O | O | C |
| B | O | O | O | C | O | C | C | O | C | C | C | C | C | O | O | O | O | O | C |
| C | C | C | O | O | C | C | O | O | O | O | O | C | C | O | O | O | O | O | C |
| D | C | C | C | C | C | C | C | O | O | O | O | C | C | O | O | O | O | O | C |
| E | C | C | C | O | O | C | C | O | O | O | O | C | C | O | O | O | O | O | C |
| F | C | C | C | O | O | O | C | O | O | O | O | C | C | O | O | O | O | O | C |
| G | C | C | C | O | C | C | C | O | O | O | O | C | C | O | O | O | O | O | C |

Fig. 11 — PLC CONTROLLED PREPARATION FOR LONG TERM STANDBY

| Sequence | V1 | V2 | V3 | V4 | V5 | V6 | V7 | MV1 | MV2 | MV3 | MV4 | MV5 | MV6 | MV7 | MV8 | MV9 | MV10 | MV11 | MV12 |
|---|---|---|---|---|---|---|---|---|---|---|---|---|---|---|---|---|---|---|---|
| A | C | C | C | O | O | C | C | O | C | O | C | O | C | O | C | O | C | O | C |
| B | C | C | C | O | O | C | C | O | C | O | C | O | C | O | C | O | C | O | C |
| C | C | C | C | O | O | C | C | O | C | O | C | O | C | O | C | O | C | O | C |

Fig. 12 — PLC CONTROLLED PROCESS PREPARATION AFTER LONG TERM STANDBY

| Sequence | V1 | V2 | V3 | V4 | V5 | V6 | V7 | MV1 | MV2 | MV3 | MV4 | MV5 | MV6 | MV7 | MV8 | MV9 | MV10 | MV11 | MV12 |
|---|---|---|---|---|---|---|---|---|---|---|---|---|---|---|---|---|---|---|---|
| A | C | C | C | O | O | C | C | C | C | O | C | O | C | O | C | C | C | C | C |
| B | C | C | C | O | O | C | C | O | C | O | C | O | C | O | C | O | C | O | C |
| C | C | C | C | O | O | C | C | O | C | O | C | O | C | O | C | O | C | O | C |
| D | C | C | C | O | O | C | C | O | C | O | C | O | C | O | C | O | C | O | C |

Fig. 13 — MANUAL CONTROLLED CONTINUOUS PROCESSING (WITH ALTERNATE STEP TO ADD SEALANT WHEN REQUIRED)

| Sequence | V1 | V2 | V3 | V4 | V5 | V6 | V7 | MV1 | MV2 | MV3 | MV4 | MV5 | MV6 | MV7 | MV8 | MV9 | MV10 | MV11 | MV12 |
|---|---|---|---|---|---|---|---|---|---|---|---|---|---|---|---|---|---|---|---|
| A | O | O | O | O | O | C | O | O | C | C | C | C | C | C | O | O | C | C | C |
| B | O | O | O | O | O | C | O | O | C | O | O | O | O | O | O | O | O | O | C |
| C | O | O | O | O | O | C | O | O | C | O | O | O | O | O | C | C | O | O | C |
| D | O | O | O | O | O | C | O | O | C | O | O | O | O | O | C | O | O | C | C |
| E | O | O | O | O | O | C | O | O | C | C | C | C | C | C | C | C | C | C | C |
| F | O | O | O | O | O | C | O | O | C | C | C | C | C | C | C | C | C | C | C |
| G | O | O | O | O | O | C | O | O | C | C | C | C | C | C | C | C | C | C | C |
| H | O | O | O | O | O | C | O | O | C | C | C | C | C | C | C | C | C | C | C |

Fig. 14 — MANUAL CONTROLLED MODERATELY DELAYED (SHORT-TERM STANDBY) PROCESSING (WITH ALTERNATE STEP FOR CYCLE DELAY)

| Sequence | V1 | V2 | V3 | V4 | V5 | V6 | V7 | MV1 | MV2 | MV3 | MV4 | MV5 | MV6 | MV7 | MV8 | MV9 | MV10 | MV11 | MV12 |
|---|---|---|---|---|---|---|---|---|---|---|---|---|---|---|---|---|---|---|---|
| A | O | O | O | O | O | C | O | O | C | C | C | C | C | C | O | O | C | C | C |
| B | O | O | O | O | O | C | O | O | C | O | O | O | O | O | O | O | O | O | C |
| C | O | O | O | O | O | C | O | C | C | C | C | C | C | C | C | C | O | O | C |
| D | O | O | O | O | O | C | O | O | C | O | O | O | O | O | C | C | O | O | C |
| E | O | O | O | O | O | C | O | O | C | O | O | O | O | O | C | O | O | C | C |
| F | O | O | O | O | O | C | O | O | C | C | C | C | C | C | C | C | C | C | C |
| G | O | O | O | O | O | C | O | O | C | C | C | C | C | C | C | C | C | C | C |

Fig. 15 — MANUAL CONTROLLED PREPARATION FOR LONG TERM STANDBY

| Sequence | V1 | V2 | V3 | V4 | V5 | V6 | V7 | MV1 | MV2 | MV3 | MV4 | MV5 | MV6 | MV7 | MV8 | MV9 | MV10 | MV11 | MV12 |
|---|---|---|---|---|---|---|---|---|---|---|---|---|---|---|---|---|---|---|---|
| A | O | O | O | O | O | C | O | O | C | C | C | C | C | C | O | O | C | C | C |
| B | O | O | O | O | O | C | O | C | C | C | C | C | C | C | C | C | O | O | C |
| C | O | O | O | O | O | C | O | C | C | C | C | C | C | C | C | C | C | C | C |

Fig. 16 — MANUAL CONTROLLED PROCESS PREPARATION AFTER LONG TERM STANDBY

| Sequence | V1 | V2 | V3 | V4 | V5 | V6 | V7 | MV1 | MV2 | MV3 | MV4 | MV5 | MV6 | MV7 | MV8 | MV9 | MV10 | MV11 | MV12 |
|---|---|---|---|---|---|---|---|---|---|---|---|---|---|---|---|---|---|---|---|
| A | O | O | O | O | O | C | O | O | C | C | C | C | C | C | O | O | C | C | C |
| B | O | O | O | O | O | C | O | O | C | O | O | O | O | O | O | O | O | O | C |
| C | O | O | O | O | O | C | O | O | C | O | O | O | O | O | C | C | C | C | C |

RESIN IMPREGNATION PROCESS WITH ENHANCED FLUIDIC CONTROL

CROSS REFERENCE TO RELATED APPLICATIONS

This Application claims the benefit of U.S. Provisional Application Nos. 60/700,150 and 60/700,151, both of which were filed Jul. 18, 2005, the entire disclosures of which are hereby incorporated herein by reference.

FIELD OF THE INVENTION

The present invention relates to inert gas-filled disk drives, and more particularly to methods of making sealed disk drive castings for purposes of retaining low density gas within an enclosure formed by the castings, including transferring disk drive casting sealant between a storage tank and autoclave as part of the manufacturing process.

BACKGROUND OF THE INVENTION

Hard disk drives incorporate magnetic storage disks and read/write heads that are capable of reading data from and writing data onto the rotating storage disks. Data is typically stored on each magnetic storage disk in a number of concentric tracks on the disk. The read/write heads, also referred to as read/write transducers or read/write elements, are integrated within a slider. The slider, in turn, is part of an actuator assembly which positions the heads relative to the surface of the storage disks. This may be at a predetermined height above the corresponding storage disk or, in some instances, in contact with the surface of the storage disk. The actuator assembly is typically positioned by a voice coil motor which acts to position the slider over a desired track. One or more read/write heads may be integrated within a single slider. In the case of non-contact sliders, a cushion of air is generated between the slider and the rotating disk. The cushion is often referred to as an air bearing.

Hard disk drives are an efficient and cost effective solution for data storage. Depending upon the requirements of the particular application, a disk drive may include anywhere from one to a plurality of hard disks and data may be stored on one or both surfaces of each disk. While hard disk drives are traditionally thought of as a component of a personal computer or as a network server, usage has expanded to include other storage applications such as set top boxes for recording and time shifting of television programs, personal digital assistants, cameras, music players and other consumer electronic devices, each having differing information storage capacity requirements.

A primary goal of disk drive assemblies is to provide maximum recording density on the storage disk. In order to provide greater storage capacity on a storage disk, track widths have become increasingly more narrow. However, decreasing the width of tracks makes it more difficult for the read/write heads to accurately read and write information to and from the narrowing tracks. Not only is it difficult to physically position the read/write element over a narrow width track, but it is increasingly difficult to maintain the read/write element over the track at an optimal position for accurate data transfer. Air turbulence created by the spinning disks, disk flutter and spindle vibrations, temperature and altitude can all adversely effect registration of the read/write element relative to the tracks. Moreover, increasing the speed of the rotating disks to achieve increased data access times increases air turbulence, which increases misregistration between the read/write element and the tracks on the storage disks (track misregistration or TMR). Higher rotational speeds can also increase disk flutter and spindle vibrations further increasing TMR. Higher rotational speeds can also increase spindle motor power and idle acoustics.

Accuracy can be further adversely affected if the read/write heads are not maintained within an optimum height range above the surface of the storage disk. Thus, a related goal is to increase reading efficiency or to reduce reading errors, while increasing recording density. Reducing the distance between the magnetic transducer and the recording medium of the disk generally advances both of those goals. Indeed, from a recording standpoint, the slider is ideally maintained in direct contact with the recording medium (the disk) to position the magnetic transducer as close to the magnetized portion of the disk as possible. Contact positioning of the slider permits tracks to be written more narrowly and reduces errors when writing data to the tracks. However, since the disk rotates many thousands of revolutions per minute or more, continuous direct contact between the slider and the recording medium can cause unacceptable wear on these components. Excessive wear on the recording medium can result in the loss of data, among other things. Excessive wear on the slider can result in contact between the read/write transducer and the disk surface resulting, in turn, in failure of the transducer, which can cause catastrophic failure.

Similarly, the efficiency of reading data from a disk increases as the read element is moved closer to the disk. Because the signal to noise ratio increases with decreasing distance between the magnetic transducer and the disk, moving the read/write element closer to the disk increases reading efficiency. As previously mentioned, the ideal solution would be to place the slider in contact with the disk surface, but there are attendant disadvantages. In non-contact disk drives there are also limitations on how close a read/write element may be to the surface of a disk. A range of spacing is required for several reasons, including the manufacturing tolerances of the components, texturing of the disk surface and environmental conditions, such as altitude and temperature. These factors, as well as air turbulence, disk flutter and spindle vibration, can cause the read/write element flying height to vary or even cause the read/write element to contact the spinning disk.

Disk drives are assembled in a clean room to reduce contamination from entering the drive prior to final assembly. Thus, the air that is trapped within the drive once it is finally sealed is filtered room air. Accordingly, seals used in disk drives between the housing components, such as the base plate and cover, are designed to prevent contaminants from entering the drive. Such seals are not designed to prevent internal air and other gases from exiting through the seal and out of the drive. Loss of gas in this manner is anticipated and accommodated by use of a filtered port to maintain equalized air pressure within the drive compared to that of air pressure outside of the drive.

As an alternative to air-filled drives, advantages may be achieved by filling disk drives with gases having a lower density than air. For example, helium has a lower density than air at similar pressures and temperatures and can enhance drive performance. As used herein, a low density gas or a lower density gas means a gas having a density less than that of air. When compared with air, lower density gases can reduce aerodynamic drag experienced by spinning disks within the drive, thereby reducing power requirements for the spindle motor. A low density gas-filled drive thus uses less power than a comparable disk drive that operates in an air environment. Relatedly, the reduction in drag forces within the low density gas-filled drive reduces the amount of aerodynamic turbulence that is experienced by drive components such as the actuator arms, suspensions and read/write heads. Reduction in turbulence allows drives filled with low density gas to operate at higher speeds compared with air-filled drives, while maintaining the same flying height and thereby maintaining the same range of read/write errors. Low density gas-filled drives also allow for higher storage capacities through higher recording densities due to the fact that there is less turbulence within the drive which allows the tracks to be spaced more closely together.

The die casting process, as well as other methods of manufacturing housing components, often results in the components having a porosity (small pock mark-shaped craters or pits) at the surface and within the body of the component (small voids in the grain structures of the material). This porosity can inhibit or prevent an adequate seal between two abutting surfaces of two different components when there are pits or craters on the abutting surfaces and, similarly, can prevent an adequate seal of openings in a component, such as an opening in a base plate for a spindle motor, when the act of forming the opening exposes air pockets in the body of the component. Additionally, surface porosity can inhibit or prevent adequate sealing between an assembly of two parts that includes an epoxy or adhesive material at the interface. Porosity within the body of the components can also allow low-density gas to permeate through the walls of the enclosure. Porosity of these kinds must be accounted for when making a low-density gas filled disk drive.

To achieve hermetic sealing, some components of the disk drive, usually the die castings, can be treated with a sealant that is intended to reduce the porosity of the components, thereby reducing the amount of gas allowed to escape the disk drive. Most sealant treatment methods typically employ an autoclave or similar vessel for holding die castings and a means for sealant storage within the autoclave or via a discrete tank. In the case where a discrete storage tank is used, the autoclave is closed and sealed and a vacuum is pulled into the autoclave. A transfer valve between the storage tank and autoclave is opened and sealant is forced from the storage tank (at atmospheric pressure) to the autoclave (at vacuum pressure) where the pressurized environment forces the sealant into the surface cavities. The large pressure gradient, sometimes as large as 14.7 psia, between the storage tank and autoclave also causes the sealant to flow at a relatively high velocity resulting in a turbulent flow. As a consequence of the turbulent flow, the sealant begins to foam and encapsulate air.

Once the castings are fully submerged in the sealant, the transfer valve between the autoclave and storage tank is closed. The vacuum pressure in the autoclave is maintained for a predetermined period of time, and then atmospheric air is vented into the autoclave to force the sealant into the evacuated pores and crevasses in the castings. While the sealant is being forced into the pores of the casting, vacuum pressure is created in the storage tank.

After the sealant has been allowed to substantially penetrate pores and crevasses of the castings, the transfer valve between the autoclave and storage tank is opened. At this point there is atmospheric or increased pressure in the autoclave and vacuum pressure in the storage tank. Due to this pressure difference between the autoclave and storage tank, sealant is moved back to the storage tank at a relatively high velocity again resulting in foaming of the sealant due to turbulent flow. When the sealant is returned to the storage tank, the transfer valve is closed again and atmospheric air can be reintroduced to the storage tank. The autoclave is then opened and the castings are removed. The autoclave then waits in stand-by mode until another impregnation cycle is desired.

A problem with the impregnation cycle described above is the turbulent flow of sealant between the autoclave and storage tank causes the sealant to cavitate and create gas bubbles. When the sealant is impregnated into the castings, the gas bubbles may also be trapped therein. If the gas bubbles burst during the pressurized sealing process additional sealant will fill the void left by the burst bubble. However, if a gas bubble subsequently remains in a casting pore or crevasse, after the casting has been removed from the autoclave, an unsealed surface void remains which may ultimately lead to leakage of gas from the disk drive. The warranted life of an average disk drive may be decreased significantly if too much low density gas is allowed to exit the disk drive. As the life of the disk drive decreases, so does the potential market value of the disk drive.

In addition, the existence of dissolved or suspended air in the sealant further impedes the ability of the sealant to penetrate pores and crevasses of the casting. This condition can lead to variations in sealant penetration uniformity over the casting. The addition of bubbles to the sealant also decreases the permeability of the sealant. Thus, under turbulent flow conditions, the permeability of the sealant degrades as it is moved between the storage tank and autoclave, ultimately resulting in a lower quality sealant. Of course, the bubbles can be removed from the sealant, but this "de-gassing" process is time consuming and decreases the efficiency of the overall disk drive manufacturing process.

Another problem with the impregnation cycle of the prior art is that debris and other particulate matter may be introduced to the sealant as it passes between and sits in the autoclave and storage tank. The sealant is initially bought as a relatively "clean" product, meaning that it has few impurities. However, as the sealant is reused and moved between the autoclave and storage tank, the cleanliness of the sealant may become compromised. Any particles or debris that are carried to the autoclave with the castings or while the autoclave is open, or are otherwise introduced to the sealant during the impregnation process will likely remain in the sealant. It is important to maintain a clean sealant because if the impurities are trapped in a pore or crevasse of the casting and later become dislodged a passageway for gas to exit the disk drive may be created.

SUMMARY OF THE INVENTION

In one embodiment, a method of sealing disk drive housing components, such as aluminum die-cast base plates and covers, is disclosed. The preferred process comprises setting an autoclave pressure and a sealant storage tank pressure to substantially the same pressure. Thereafter, the process continues by opening a transfer valve or similar type of separation mechanism between the autoclave and storage tank. Once the transfer valve has been opened, the pressure in the storage tank is slightly and controllably increased resulting in a small pressure differential between the autoclave and storage tank. The small pressure gradient results in a laminar flowing of the sealant from the storage tank to the autoclave. It is preferable to maintain laminar flow of the sealant as it transfers from the storage tank to the autoclave in an attempt to minimize the amount of gas created and captured by the sealant. A higher quality of sealant will result if the occurrence of gas bubbles in the sealant can be reduced. Essentially, the original permeability of the sealant (i.e., the permeability of the sealant at the time of purchase) can be maintained more easily if turbulent flow can be avoided.

In accordance with at least one embodiment, as the sealant passes from the storage tank to the autoclave, the sealant is filtered. An in-line filter or other type of sealant purification mechanism may be placed in the conduit connecting the storage tank and autoclave. As the sealant flows from the storage tank to the autoclave it passes through the filter, and debris that has been introduced to the sealant can be removed. The filter may comprise a number of filters, each of which filters a sequentially smaller particle size from the sealant. In an alternative embodiment, the filter comprises a single debris filter that is able to remove matter of a particular size or greater.

Sealant is flowed into the autoclave until the castings are substantially submerged in the sealant. After the sealant has reached a predetermined level in the autoclave, the transfer valve between the storage tank and autoclave is closed thereby separating the autoclave and storage tank. After the transfer valve is closed, an increased and controlled pressure is introduced into the autoclave. The increase in pressure causes the sealant to further penetrate the pores and crevasses of the castings. It is desirable to allow the sealant to penetrate the castings such that the pores and crevasses are substantially sealed. As the pores and crevasses of a casing are sealed, the chances of gas escaping from a disk drive made with the castings are reduced.

Once the castings have been substantially impregnated with the sealant, the sealant is transferred back from the autoclave to the storage tank. The sealant is transferred back to the storage tank under laminar conditions thus reducing the amount of gas and air created and encapsulated by the sealant. Also, as the sealant is transferred back to the storage tank it is filtered. The filtering of the sealant helps remove debris that may have been introduced to the sealant by the castings or the autoclave. The filter used to remove debris and other particulate matter from the sealant may be the same filter that was used to remove debris as the sealant transferred to the autoclave. Alternatively, the sealant may be transferred back to the storage tank via a different transfer line having a different filter that is used to filter a specific type of matter that is more likely to be introduced to the sealant by the autoclave/castings.

The above-described process may be repeated if it is desired to twice impregnate the castings. In an alternative embodiment, the castings may be treated with the sealant only once. A description of a casting treatment process is described in U.S. patent application Ser. No. 10/839,608 to deJesus et al., the entire disclosure of which is hereby incorporated herein by this reference. The process described in the '608 patent application described twice impregnating the castings to ensure that substantially all of the pores/crevasses of the castings are filled with the sealant.

Variations in the process will occur to persons of skill in the art. Various types of sealant can be used, although the preferred epoxy is methacrylate. As can further be appreciated, the process can be used in any other application where it is desired to maintain a laminar flow of fluid between two separate locations. The process described herein is not necessarily confined to treatment of disk drive parts.

These and other advantages will be apparent from the disclosure of the invention(s) contained herein. The above-described embodiments and configurations are neither complete nor exhaustive. As will be appreciated, other embodiments of the invention are possible using, alone or in combination, one or more of the features set forth above or described in detail below.

DETAILED DESCRIPTION

Figures 1, 5:
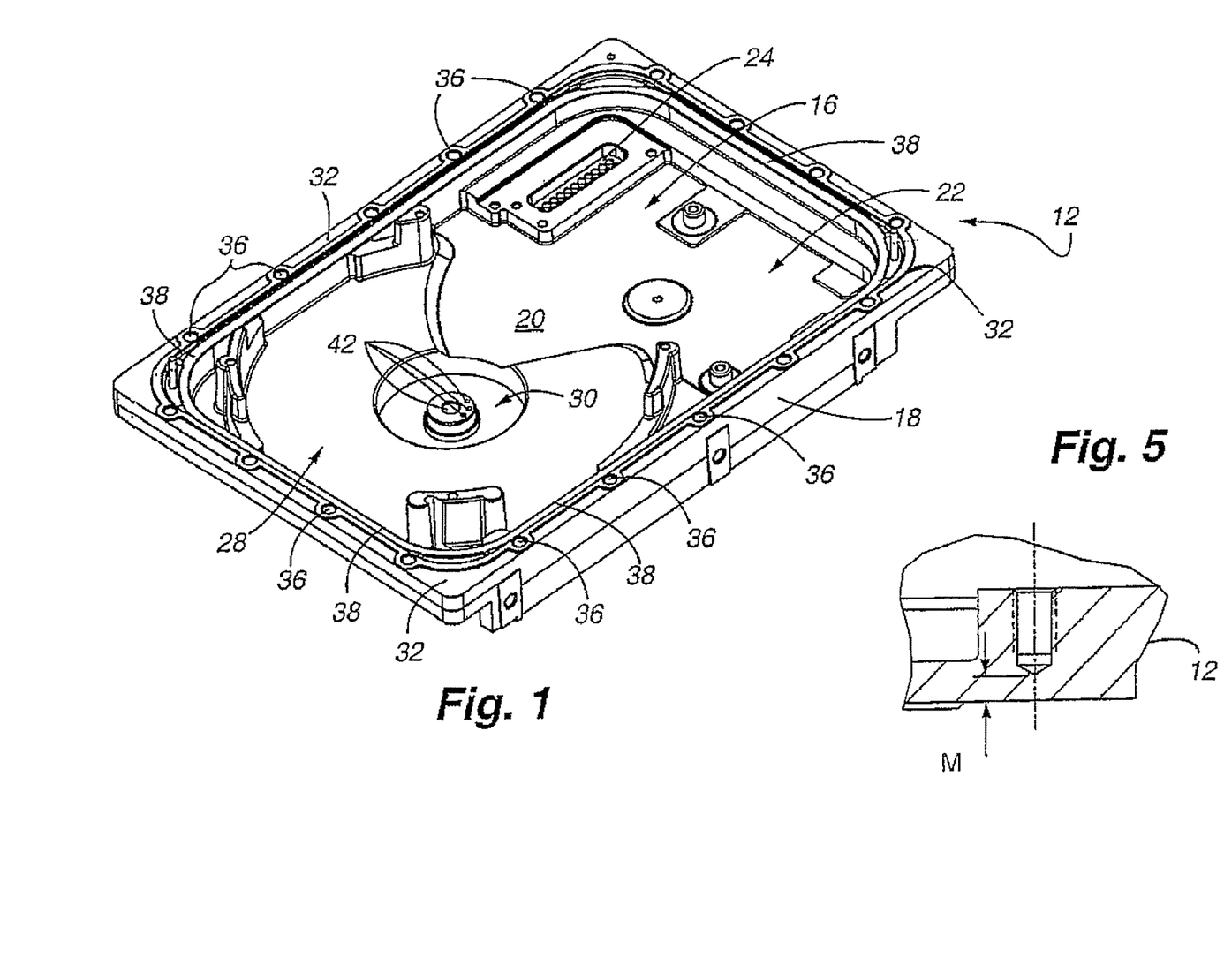
FIG. 1 is a perspective view of a base plate for a hard disk drive.
FIG. 5 is a cross-section of a portion of a base plate.
Figure 2:
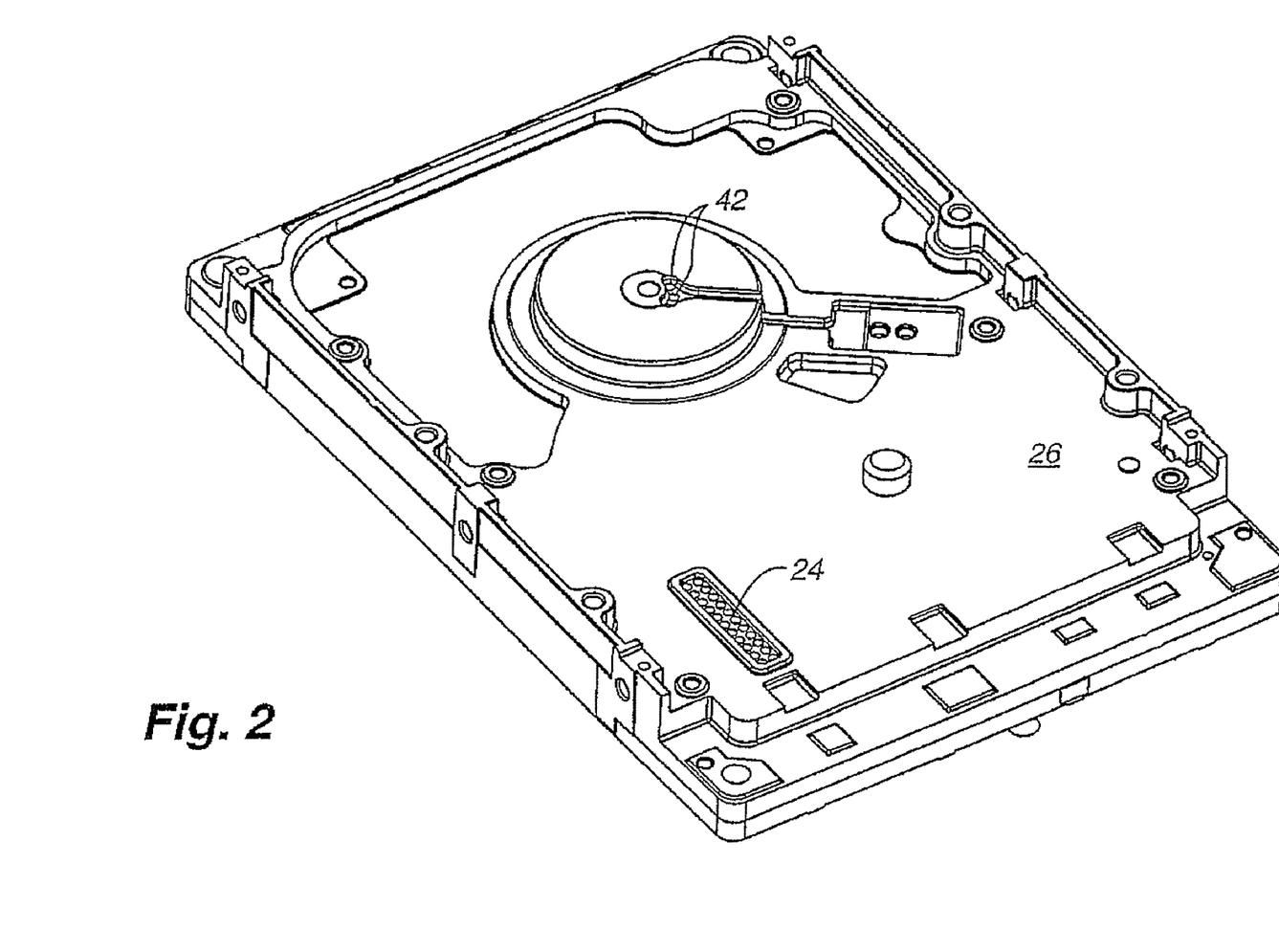
FIG. 2 is a perspective view of the opposite side of the base plate shown in FIG. 1.
Figure 3:
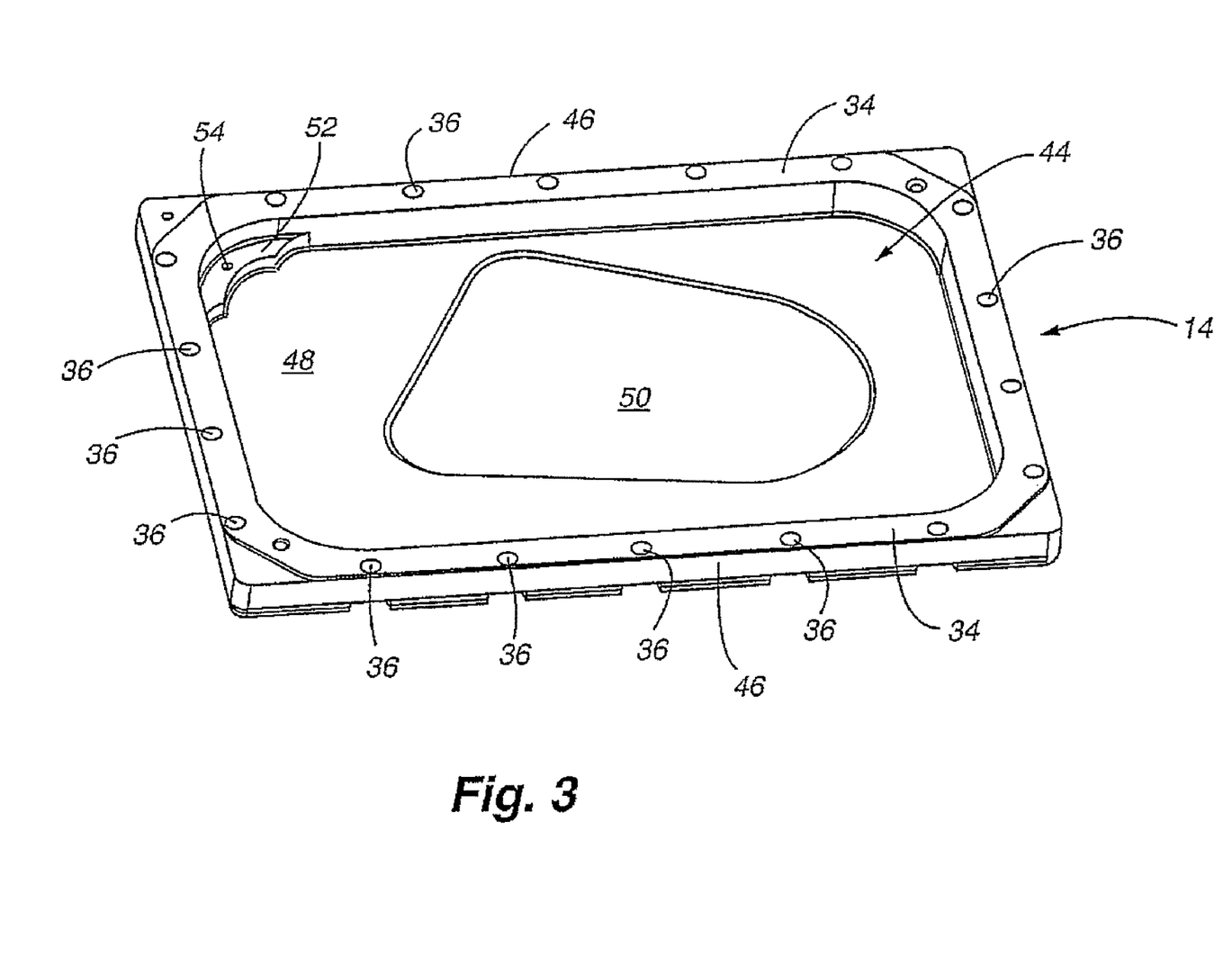
FIG. 3 is a perspective view of a cover for a disk drive.

A conventional hard disk drive housing is comprised of a base plate 12 and cover 14 as shown in FIGS. 1-4. The base plate generally includes an inner chamber 16 defined by a perimeter wall 18 and an inside bottom surface 20. The inside bottom surface 20 has a first portion 22 generally defining where the actuator assembly (not shown) is mounted. An opening 24 is formed in the first portion to accommodate a multi-pin connector (not shown) for interconnecting the actuator assembly and read/write heads to the printed circuit board (not shown) mounted to the outside bottom surface 26 of the base plate (FIG. 2). A second portion 28 of the inside bottom surface defines where the disk stack is mounted. In the illustrated embodiment, the second portion is elevated compared to the first portion and further includes a central recess 30 to accommodate a spin motor (not shown). The perimeter wall 18 includes a generally planar upper surface 32 which abuts a complementary surface 34 of the cover (FIG. 3). A plurality of aligned apertures 36 in the base plate and cover receive fasteners (not shown) to attach the cover to the base plate. The apertures in the base plate are typically threaded, as are the fasteners. The inside edge of the upper planar surface 32 forms a recess or shoulder 38. In a low density gas-filled drive, a metal seal (not shown), such as a C-shaped seal, is positioned in the recess 38 to form a uniform seal between the cover and base plate. The base plate may also include openings or apertures 42 to accommodate electrical connections between the spin motor and printed circuit board.

Figure 4:
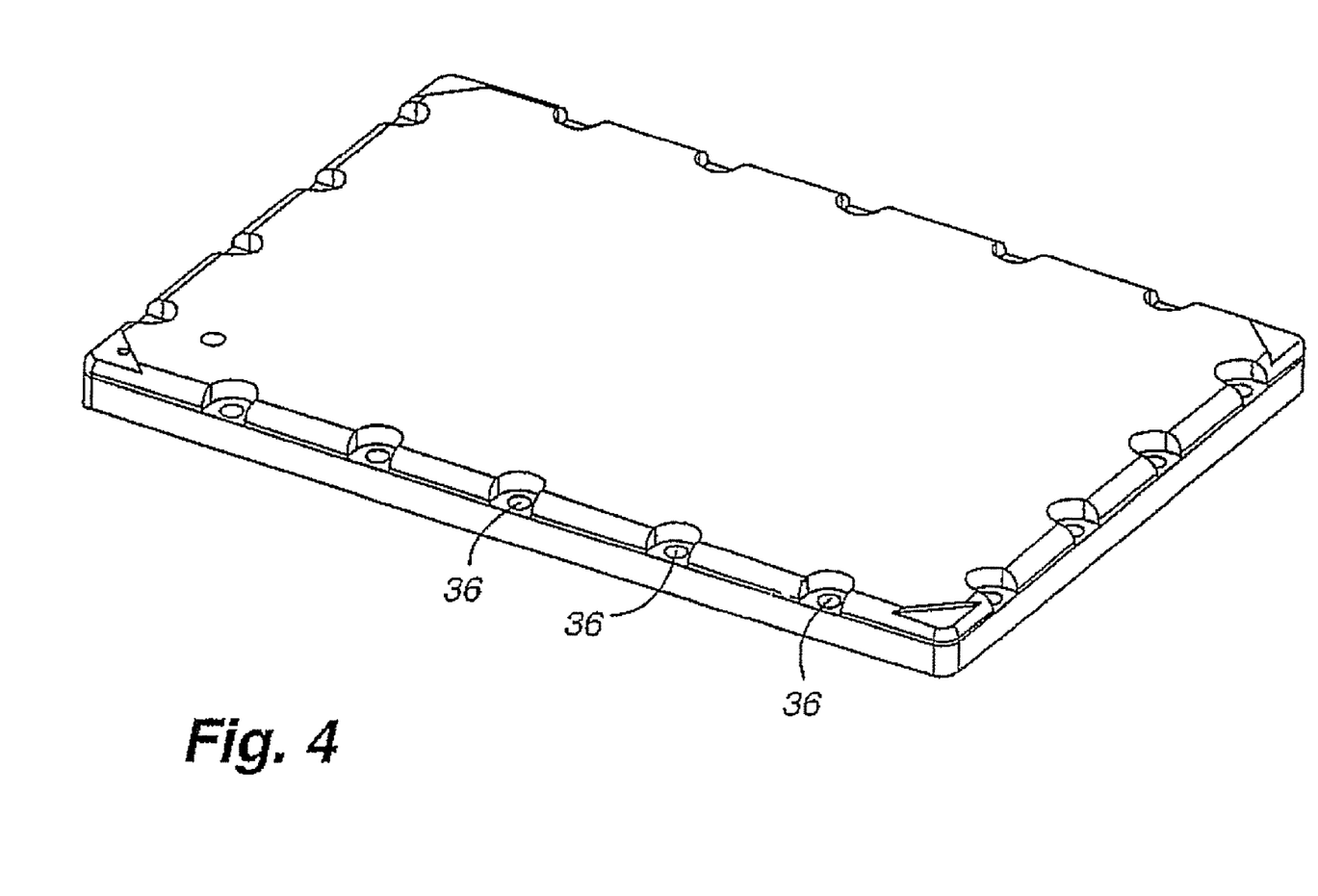
FIG. 4 is a perspective view of the opposite side of the cover shown in FIG. 3.

The cover 14 also includes an inner chamber 44 defined by the perimeter wall 46. The inside bottom surface 48 may include one or more additional recesses 50 to accommodate the components mounted to the base plate such as the actuator assembly and disk stack. In addition, the cover may include a thickened portion 52 inside of the perimeter wall for purposes of locating an aperture 54 extending through the cover. Once the drive components are fully assembled within the base plate and the cover is attached to the base plate, the aperture 54 may be used as a port to fill the drive with low density gas. It should be appreciated that this aperture may be formed at other locations on the cover or base plate.

Figure 6:
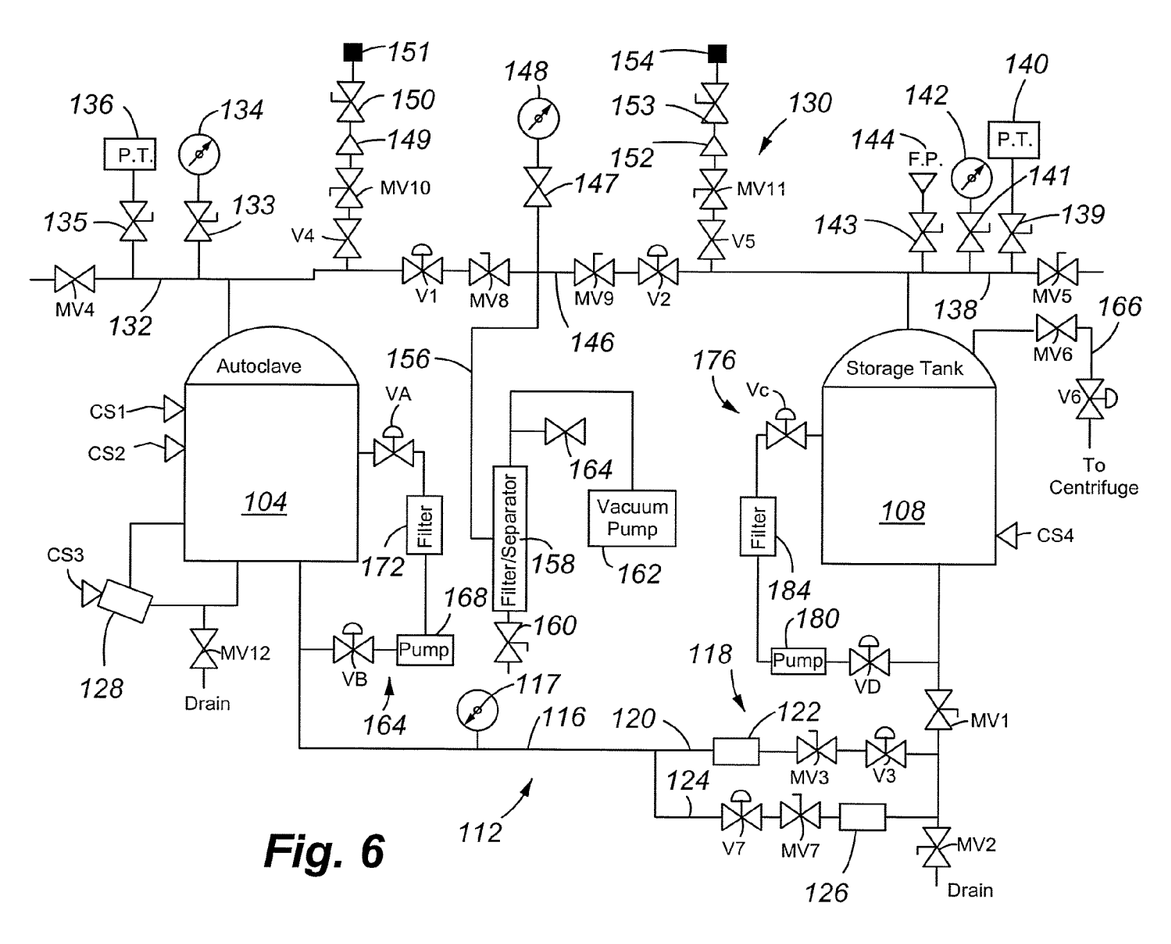
FIG. 6 is a schematic diagram depicting one embodiment of a sealant system used to transfer sealant to/from an autoclave.

With reference now to FIG. 6, a system used to treat base plates and covers made by a casting process will be described in accordance with at least some embodiments of the present invention. The system generally comprises an autoclave 104, a storage tank 108 and a first conduit 112 providing a fluid communication between the autoclave 104 and storage tank 108. The autoclave 104 and storage tank 108 may include any type of pressure chamber that can be sealed and have a pressure applied within the chamber that differs from the pressure outside the chamber.

The conduit 112 connecting the autoclave 104 and storage tank 108 comprises a first end 116 that connects to the autoclave 104 and a second end 118 connected to the storage tank 108. The first end 116 may have a gage 117 connected thereto to measure certain parameters associated with the conduit 116 or any substance traveling through the conduit 112. The gage 117 may comprise a thermometer, a pressure gage, a strain gage, flow meter, or the like.

The second end 118 of the conduit 112 may comprise two fluid paths 120, 124. The first fluid path 120 may be used to transmit sealant from the storage tank 108 to the autoclave 104. The first fluid path 120 may comprise a manual valve MV3, a process valve V3 that is automatically controlled, and a filter 122. The filter 122 may be designed to remove particulate matter from the sealant as it passes through the first fluid path 120. The filter 122 may remove debris from the sealant that is greater than or equal to a predetermined size. On the other hand, the filter 122 may also be designed to remove particles from the sealant based on physical and/or chemical properties like magnetic properties, optical properties, and chemical composition.

In accordance with at least one embodiment of the present invention, the filters 122, 126 comprise a series of filters that remove increasingly smaller particles. In other words, a first in the series of filters removes particles of a first relatively large size. Thereafter, the sealant flows through a second in the series of filters that removes particles of a second size that is somewhat smaller than the first size. A third filter in the series of filters can then remove particles of smaller size than the second filter. Up to N filters may be placed in series to help filter as much debris from the sealant as possible.

The second fluid path 124 also comprises a manual valve MV7, a process valve V7, and/or a filter 126. The valves in the second fluid path 124 may be actuated to allow sealant to flow from the autoclave 104 to the storage tank 108. As sealant passes through the second fluid path 124 it gets treated by the filter 126 that removes debris or the like that may have been introduced to the sealant while the sealant was in the autoclave 104. The second end 118 may further comprise a valve MV1 that controls flow of sealant from the storage tank 108 into the conduit 112 and vice versa. Furthermore, the second end 118 may comprise another valve MV2 that controls sealant flow to the drain. Generally, the sealant is transferred between the storage tank 108 and autoclave 104 multiple times and is reused on many batches. However, after a certain amount of time, the sealant may have lost some beneficial properties and should therefore be disposed of in an appropriate member, via the drain.

The autoclave 104 may comprise a number of censors CS1, CS2, and CS3 each of which are capable of measuring fluid levels within the autoclave 104. The sensor CS1 is operable to measure and identify when the fluid levels within the autoclave 104 have reached a maximum threshold. Likewise, the sensor CS2 is operable to measure and identify minimum fluid levels within the autoclave 104. The minimum threshold measured by sensor CS2 represents the minimum amount of fluid required to substantially surround the castings with sealant, and will indicate to the process operator that additional sealant must be added prior to any subsequent impregnation cycle. The sensor CS3 is used to determine when the autoclave 104 is substantially drained of sealant and the removal of castings is permissible. The sensor CS3 may be connected to a sensor canister 128 that represents the lowest point of the autoclave 104. When the sensor canister 128 is empty or at least partially empty, the sensor CS3 can determine that the autoclave 104 is empty. A valve MV12 may be connected to the sensor canister 128 if any fluid therein needs to be drained and cannot be transferred via the conduit 112.

The storage tank 108 may also comprise one or more sensors CS4 that is operable to measure the fluid levels within the storage tank 108. When fluid levels within the tank reach or go below the sensor CS4 then fluid flow is discontinued between the storage tank 108 and autoclave 104. If the fluid levels have not at least reached the sensor CS2 then an indicator light or alarm will notify the process operator that more sealant must be added to the storage tank via the fill port 144 prior to any subsequent impregnation cycle. Sealant may be poured into the fill port 144 and the valve 142 connected thereto may be actuated to allow the sealant to flow into the storage tank at a relatively slow rate.

In accordance with at least some embodiments of the present invention, sealant is transferred between the storage tank 108 and autoclave 104 under laminar conditions. In other words the speed with which the fluid is transferred between the tanks is maintained such that no substantial creation and/or trapping of gas bubbles occurs within the conduit 112. As used herein laminar flow of sealant is understood to include any non-turbulent streamline flow of fluid in parallel layers (laminae). In typical applications, using a resin sealant like methacrylate having specific fluid properties, the tube diameter will be sufficiently sized to maintain laminar fluid flow during sealant transfer for a specific fluid flow rate. In applications where the tube diameter has been previously determined, the fluid transfer flow rate will be adjusted to achieve and maintain laminar fluid flow. In applications where the original resin sealant is replaced by a different resin sealant having different fluid properties, the fluid transfer flow rate will be adjusted to achieve and maintain laminar fluid flow. The continued reuse of resin sealant may allow one or more of the fluid properties to change within an acceptable and predetermined tolerance band. In this case, the fluid transfer flow rate may be adjusted to maintain laminar fluid flow.

To facilitate laminar flows of sealant between the autoclave 104 and storage tank 108 the system comprises a pressure regulation system 130. The pressure regulation system includes a first side 132 for controlling pressure in the autoclave 104 and a second side 138 for controlling pressure in the storage tank 108. The first side 132 comprises a meter valve 133 that is connected to an analog pressure meter 134. If pressure readings are desired for the autoclave side, the meter valve 133 is opened and a pressure can be read on the meter 134. The first side 132 also includes a pressure transmitter 136 that is separated from the autoclave 104 by a meter valve 135. If remote pressure readings are desired for the autoclave side, the meter valve 135 is opened. Valve MV4 is a maintenance access valve. In the event that it is desired to relieve the pressure inside the autoclave 104 or allow atmospheric air into the autoclave 104, maintenance valve MV4 can be opened thereby venting the autoclave 104 to the atmosphere.

Similar to the autoclave side 132, the storage tank side 138 may comprise a meter valve 139 connected to a pressure transmitter 140 and a meter valve 141 connected to an analog pressure meter 142. The storage tank 108 pressure may also be opened up to the atmosphere by the actuation of the maintenance access valve MV5 that can either allow atmospheric air into the storage tank 108 if the tank is at an absolute pressure below 1 atmosphere or allow pressurized air out of the storage tank 108 if the tank is at an absolute pressure above 1 atmosphere. The storage tank 108 may further be connected to a centrifuge line 166 that leads from an excess sealant recovery centrifuge. The flow of sealant from the centrifuge is controlled either manually by valve MV6 or automatically by process valve V6.

Between the autoclave side 132 and the storage tank side 138 is a middle portion 146. The middle portion may be used to pull vacuum pressure on one or both the autoclave 104 and storage tank 108. The middle portion 146 comprises a meter valve 147 and a meter 148 that is capable of supplying a pressure reading of the middle portion 146. The middle portion 146 is separated from the autoclave side 132 by a manual valve MV8 and/or an automatic process valve V1. The middle portion 146 is separated from the storage tank side 138 by a manual valve MV9 and/or an automatic process valve V2. On each side of the middle portion 146 there is a number of throttling valves V4, V5, MV10, MV11, 150, and 153, reducing bushings 149, 152, and muffler/filters 151, 154. The configuration of throttling valves, bushings, and muffler/filters on the autoclave side of the middle portion 146 is used to vent the autoclave 104 in a controlled manner such that the pressure difference between the autoclave 104 and storage tank 108 can be changed slowly, thereby maintaining a laminar flow of sealant. Moreover, the throttling valves on the autoclave side of the middle portion 146 are used to vent atmospheric pressure to the autoclave 104 in a controlled manner to induce sealant to flow into pores of castings held in the autoclave 104. Likewise, the configuration of throttling valves, bushings, and muffler/filters on the storage tank side of the middle portion 146 is used to the vent the storage tank 108 in a controlled manner to the atmosphere.

Also connected to the middle portion 146 is a vacuum line 156. The vacuum line 156 connects a vacuum pump 162 and filter/separator 158 to the middle portion 146. Valve 160 is used to drain condensation from the filter/separator, and valve 164 is for maintenance access. Vacuum can be drawn on one or both of the autoclave 104 and storage tank 108. In one embodiment, the vacuum line 156 may be separated from the autoclave 104 by having at least one of the valves MV8 and V1 closed. The vacuum line 156 is also separated from the storage tank 108 by having at least one of the valves MV9 and V2 closed. Then a vacuum can be created in the vacuum line 156. If it is desired to transfer vacuum pressure to one of the autoclave 104 and storage tank 108, then the lines between the middle portion 146 and desired pressure chamber 104, 108 are opened by actuation of the corresponding valves.

In certain impregnation line configuration, incorporating in-line filtration between the autoclave and storage tank may not be an option. In fact, some configurations may not employ a storage tank 108 at all and therefore sealant is maintained in the autoclave 104 at all times. To facilitate such constraints, a recirculation loop 164 may be provided for the autoclave 104 and a recirculation loop 176 may be provided for the storage tank 108.

For applications where sealant is transferred between the autoclave 104 and storage tank 108, a connection is made near the bottom of the autoclave 104. Another connection is made below the level of sensor CS2. Between these connects are located shut off valves, VA and VB, a recirculation pump 168, and a filter or series of filters to remove particulate matter and other debris from the sealant. With the autoclave 104 filled with sealant to a level between sensor CS1 and sensor CS2, valves VA and VB are opened and sealant if drawn through the bottom connection of the autoclave 104, pumped to an appropriate pressure to pass laminarly through the filter(s) 172, and delivered back to the autoclave 104 through the top connection. The location of each connection may be specifically determined to ensure that when the autoclave 104 is properly filled, optimal filtering performance of the sealant in the recirculation loop 164 is achieved and maintained. Drawing sealant from the lowest point of the autoclave 104 helps remove particulates that may settle to the bottom of the autoclave 104. Returning filtered sealant below the level of sensor CS2 helps ensure that the sealant is delivered below the top of the sealant pool, which helps to minimize sealant aeration.

In a similar fashion, if a storage tank 108 is utilized with the autoclave 104, the above-described recirculation configuration can be optionally or additionally incorporated with the storage tank 108. Specifically the bottom connection of the recirculation loop 176 is made to the bottom of the storage tank 108 and the top connection is made below the top surface of the sealant pool in the storage tank 108. To pull sealant from the storage tank 108, valves VC and VD are opened and pump 180 is activated to pull sealant from the bottom of the storage tank 108. The sealant is passed through the filter(s) 184 and at least a portion of particulate debris therein is removed. Thereafter, the sealant is returned to the storage tank 108 at the top connection below the top level of the sealant pool.

The recirculation loop 164, 176 can be engaged at defined intervals between impregnation cycles, and during short and long-term stand-by process modes. These intervals can be determined based on the efficiency of the filter(s) 172, 184, cleanliness and quality of the castings being sealed, and volume of castings going through an impregnation process. When not being utilized, the shut off valves VA, VB, VC, and/or VD are closed to isolate the filtration loop 164, 176 from the normal impregnation process to protect the pump 168, 180 and filter(s) 172, 184 from the extreme vacuum pressures achieved during the impregnation process.

Figure 7:
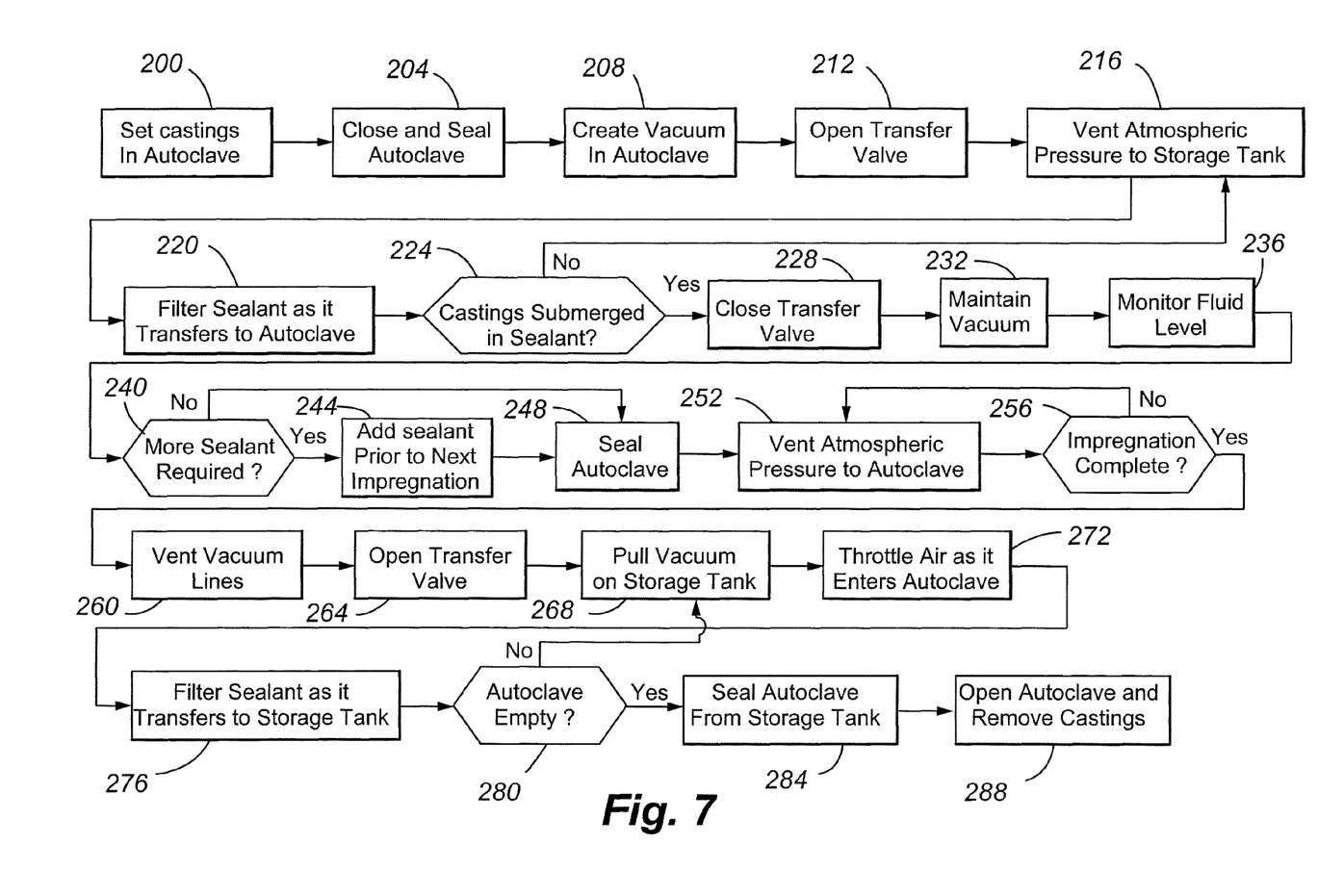
FIG. 7 is a flow diagram depicting one embodiment of the sealant processing method.

Turning to FIG. 7, a flow chart generally describing the preferred method of impregnating disk drive housing components according to one embodiment of the present invention is shown. The process applies to base plates and cover plates made by a casting process. The casting process results in components having voids or porous grain structure in the material. The size of the pores will vary depending upon the casting process. The size of the pores may be referred to as the porosity of the material. Exemplary embodiments of a base plate and cover are shown in FIGS. 1-4. Additionally, the preferred embodiment is described in association with aluminum casting components. It should be appreciated that the process would work with components made from other materials such as steel, zinc and magnesium.

As a threshold step, it is preferable that the disk drive housing components be created from a process that minimizes porosity within the components. For example, base plates and covers are typically made by a casting process using aluminum. Castings which meet the American Society of Testing and Methods (ASTM) E505, Category A, provide suitable low porosity components. Such castings have porosity in external part surfaces which does not exceed 0.127 millimeters in diameter. Internal pores may be larger. A desired level of porosity which does not exceed 0.127 millimeters in diameter may be achieved using chill block cooling or vacuum-assist methodology for die casting for type A380 or 383 aluminum.

Once the components have been cast, one or more of the castings are set in the autoclave 104 (step 200). The castings may be placed in a holder as described in the '608 application, which is incorporated by reference herein. After the castings are suitably positioned within the autoclave 104, the autoclave 104 is closed and sealed (step 204).

With the autoclave 104 sealed, a vacuum is created in the autoclave (step 208). The vacuum is created in the autoclave 104 because the storage tank 108 is presumably maintained at vacuum pressure. In the event that the storage tank 108 initially has an internal pressure that differs from that of a vacuum, the pressure within the autoclave 104 is adjusted to substantially match that of the storage tank 108. However, it is advantageous to maintain a vacuum within the storage tank 108, which helps to de-gas the sealant as it sits in the storage tank 108. The sealant may be degassed as it sits in either the autoclave 104 or storage tank 108 under absolute pressure conditions that are substantially less than atmospheric pressure conditions.

Once the internal pressures of the autoclave 104 and storage tank 108 have been adjusted to substantially equal one another, the one or both of the transfer valves V3 and MV3 are opened (step 212). Opening the transfer valve between the autoclave 104 and storage tank 108 creates a fluidic connection between the respective chambers. Since the pressures in the two chambers are equal, fluid transfer from the storage tank 108 to the autoclave 104 will generally be motivated only by the hydrostatic pressure head of the sealant in the storage tank 108. Eventually, fluid transfer will cease when the sealant levels in both the autoclave 104 and storage tank 108 equalize. In order to achieve the desired laminar flow rate of sealant from the storage tank 108 and autoclave 104, atmospheric pressure is vented into the storage tank 108, thereby increasing the relative pressure between the storage tank 108 and the autoclave 104 (step 216). Atmospheric pressure is vented into the storage tank in a controlled manner by the actuation of the pressure release throttling valve V5 or MV11. As a pressure gradient is created between the chambers the sealant begins to flow through the first fluid path 120. As the sealant flows through the first fluid path 120 it passes through the filter 122 and particulate debris of a predetermined size and/or having certain physical/chemical properties is removed from the sealant (step 220).

In step 224 it is determined if the castings have been sufficiently submerged in sealant. In the event that the fluid level has not yet reached a minimum threshold, the method returns to step 216 and venting of the storage tank 108 continues. In other words, sealant is flowed from the storage tank 108 to the autoclave 104 until the sensor CS2 senses fluid levels. As can be appreciated by one of skill in the art, the sealant may continue to be flowed until it reaches the sensor CS1 or the flowing may be stopped somewhere in between the levels measured by CS1 and CS2. In an alternative embodiment, the flowing may be stopped when the fluid levels in the storage tank 108 reach sensor CS4.

After the sealant has reached an acceptable level in the autoclave 104 (or a suitable level in the storage tank 108), one or both of the transfer valves V3 and/or MV3 are closed (step 228). Thereafter, a vacuum is maintained in the autoclave 104 for a predetermined period of time, thus letting the sealant settle in the autoclave (step 232). During this time, the fluid levels of the sealant are monitored (step 236). In step 240, it is determined if more sealant is required to reach an acceptable level. In the event that more sealant is required, then sealant is added to the storage tank 108 via the fill port 144 prior to any subsequent impregnation cycle (step 244, as will be described in further detail with reference to FIG. 8). Once fluid levels have reached an adequate threshold, the autoclave 104 is sealed (step 248). The steps involved in this particular procedure may be completed in parallel while a current impregnation cycle is commencing and completing.

With the autoclave 104 sealed and separated from other components in the system, atmospheric pressure is vented into the autoclave 104, which induces sealant into openings and pores of the castings (step 252). The impregnation process may be performed for a predetermined amount of time, or may be performed until the sealant has reached a second predetermined level below the starting level of the sealant. In the preferred embodiment, the submersed castings are maintained at an increased pressure for approximately ten minutes to twenty minutes.

In step 256 it is determined if the impregnation is complete. In the event that casting impregnation is not yet complete, the method returns to step 252 and more pressure is vented into the autoclave 104. In an alternative embodiment, the venting of air into the autoclave 104 is continued until the internal pressure of the autoclave 104 is substantially equal to the internal pressure of the storage tank 108. This new internal pressure of the autoclave 104 and/or storage tank 108 is generally higher than the initial internal pressure of the autoclave 104 and/or storage tank 108. In a preferred embodiment, the internal pressure of the autoclave 104 and storage tank 108 are at atmospheric pressure at the end of the casting impregnation.

When the impregnation has been completed, the middle portion 146 is vented along with the vacuum lines 156 (step 260). Thereafter, one or both of the transfer valves V7 and MV7 are opened thereby creating a fluidic connection between the autoclave 104 and storage tank 108 via the second fluid path 124 (step 264). With the transfer valve open, a vacuum is created in the storage tank 108 via the vacuum pump 162 (step 268). This results in the creation of a pressure gradient that induces a laminar flow of sealant from the autoclave 104 to the storage tank 108. As the sealant exits the autoclave 104, air is vented into the autoclave 104 replacing the exiting sealant, further helping maintain laminar flow (step 272).

As sealant flows through the second fluid path 124, the sealant is filtered by the filter 126 (step 276). As noted above, the filter 122, 126 may comprise a number of filters in series that remove foreign debris of decreasing size.

In step 280 it is determined if the autoclave 104 is empty. This particular step may be performed by referencing the sensor CS3. If the autoclave 104 is not yet empty, then the method returns to step 268 and more sealant is removed from the autoclave 104. After the autoclave 104 has been satisfactorily emptied, the autoclave 104 is sealed off from the storage tank 108 by closing one or both of the transfer valves that were previously opened (step 284). A substantial vacuum now exists in the storage tank 108 and thus the de-gassing of the sealant can continue. However, the autoclave 104 has an internal pressure that is about equal to one atmosphere. With the autoclave 104 and storage tank 108 separated, the autoclave 104 can be opened and the castings can be removed and taken to the next step in the disk drive manufacturing process (step 288).

As can be appreciated, once treated castings have been removed, new castings can be placed in the autoclave 104 and the process can start over again. In an alternative embodiment, a moderate delay between cycles can be realized. During a moderate delay, it is preferable to turn the vacuum pump 162 off and vent the vacuum lines 156, so that unnecessary damage can be avoided. Also, if necessary, additional sealant can be added to the storage tank 108 via the fill port 144. When the process is ready to begin again, a vacuum may be pulled on the storage tank 108 and the method can return to step 200.

In an alternative embodiment, a long-term standby mode may be employed between impregnation cycles. In this embodiment, the vacuum 162 is turned off and the vacuum lines 156 are vented. Thereafter, the valve MV1 is closed to seal the storage tank 108 from conduit 112. Thereafter the transfer valves between the autoclave 104 and storage tank 108 (with the exception of valve MV1) are opened allowing the sealant to be drained into a clean container. The sealant flows under the hydrostatic pressure of the sealant fluid height. The sealant is then poured back into the storage tank 108. Once the sealant reaches a predetermined level (i.e., the level measured by sensor CS3), the transfer valves are closed. To re-start the process, the transfer valve is opened and a vacuum is pulled on the storage tank 108.

Figure 8:
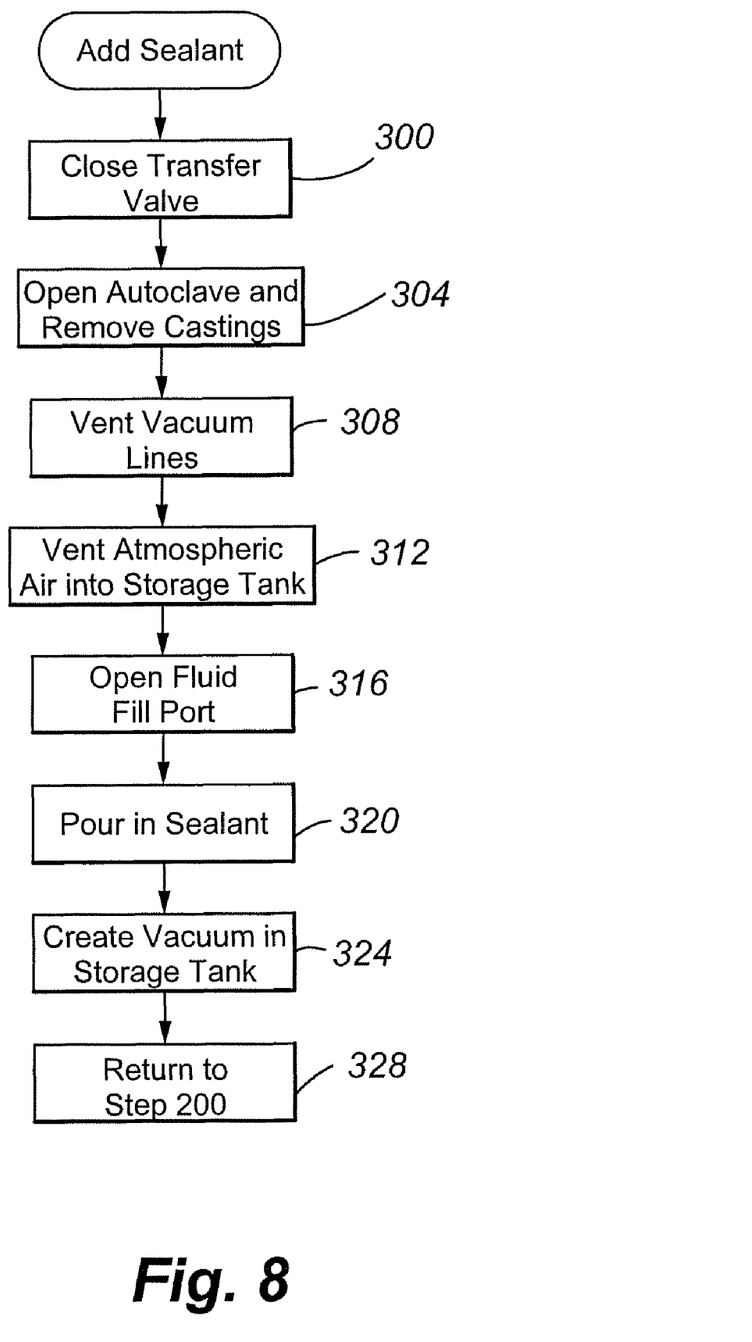
FIG. 8 is a flow diagram depicting a method of adding sealant during the impregnation process.

With reference now to FIG. 8, a method of adding sealant to the storage tank 108 will be described in accordance with at least some embodiments of the present invention. The method begins when it is determined that sealant needs to be added to the system. The transfer valve between the autoclave 104 and storage tank 108 is closed (step 300). Thereafter, the autoclave 104 is opened and the castings are removed from the autoclave 104 (step 304). Then, the vacuum lines 156 are vented and the vacuum pump 162 is turned off (step 308). With the vacuum lines 156 and middle portion 146 at atmospheric pressure, atmospheric pressure is vented into the storage tank 108 (step 312). With the storage tank 108 at atmospheric pressure it is safe to open the fluid fill port 144, thus the fill port 144 is opened (step 316) and sealant is poured into the storage tank 108 (step 320). Thereafter, the fill port 144 is closed and a vacuum is created within the storage tank 108 (step 324). With additional sealant added and the storage tank 108 back to vacuum pressure, the method returns to step 200 and the impregnation cycle is ready to begin (step 328).

Figure 9:
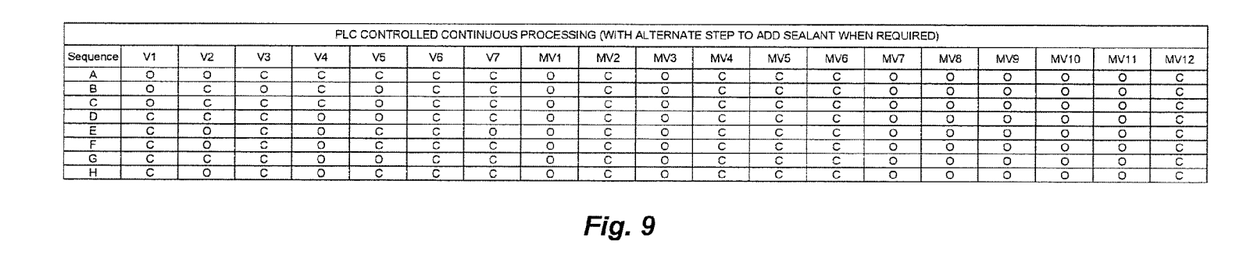
FIG. 9 is a valve state chart for continuous sealant processing using an automated controller.

As can be seen in FIGS. 9-16, valve state diagrams indicate the status of each valve depicted in the system between steps. Specifically, FIG. 9 depicts a valve state diagram for continuous processing of castings using a programmable logic controller (PLC) that can receive inputs from the various sensors of the system and actuate valves based on those inputs. During the continuous processing, valves MV1, MV3, MV7, MV8, MV9, MV10, and MV11 are open. Valves V6, MV2, MV4, MV5, MV6, and MV12 are closed. The rest of the valve positions are depicted in sequential order where step A corresponds to process steps 200-208, step B corresponds to steps 212-220, step C corresponds to steps 224-244, step D corresponds to steps 248-260, step E corresponds to steps 264-280, and step F corresponds to steps 284-288. Additional steps that may be added to the process described above include steps G and H. Step G is an alternative to step F prior to returning the system to step A that provides for the addition of sealant to the storage tank 108. Step H is the preparation of the system after the addition of sealant prior to returning to step A.

Figure 10:
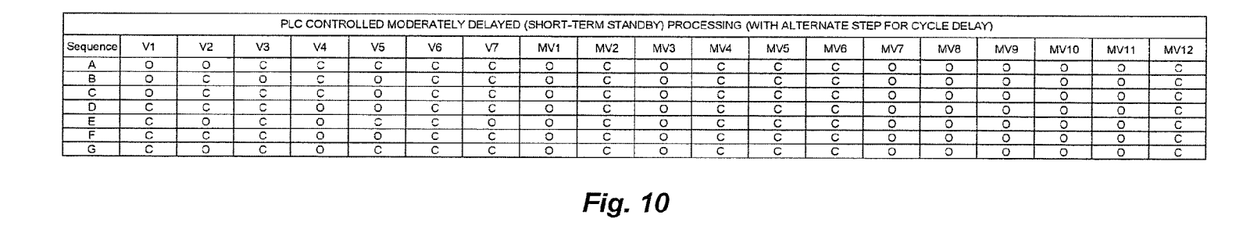
FIG. 10 is a valve state chart for moderately delayed, short-term standby processing using an automated controller.

FIG. 10 depicts a valve state diagram for the process where a delay of moderate length is used between cycles. The valve state diagram of FIG. 10 corresponds to such a process that is automatically controlled. Steps A-E of FIG. 10 generally correspond to steps A-E of FIG. 9. The difference with a moderate delay between cycles occurs at step F where the system is prepared for a moderate delay. Thereafter, step G is used to prepare the system for another cycle after a moderate delay has been endured.

Figure 11:
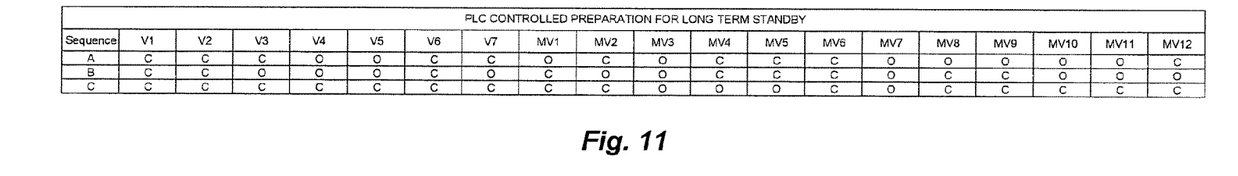
FIG. 11 is a valve state chart for preparation for a long-term standby using an automated controller.

FIG. 11 depicts a valve state diagram in preparation for a long-term standby between impregnation cycles. The valve state diagram of FIG. 11 corresponds to such a process that is automatically controlled. Step A in FIG. 11 corresponds to an alternative to step F of FIG. 9 where the system is prepared for a long-term standby, where the vacuum pump is opened and the storage tank 108 and autoclave 104 are vented to atmospheric air. Step B in FIG. 11 corresponds to closing the transfer valve MV1 between the storage tank 108 and conduit 112 then draining any sealant remaining in the autoclave 104, conduit 112, and sensor canister 128 into a clean container and pouring it back into the storage tank 108. Step C in FIG. 11 corresponds to closing transfer valves and opening the storage tank 108 and autoclave 104 to atmospheric pressure.

Figure 12:
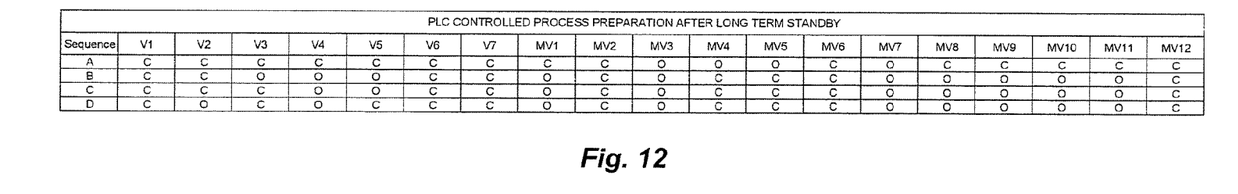
FIG. 12 is a valve state chart for resuming sealant processing after a long-term standby using an automated controller.

FIG. 12 depicts a valve state diagram for preparing to begin an impregnation cycle after a long-term standby has been endured. The valve state diagram of FIG. 12 corresponds to a process that is PLC controlled. Step A in FIG. 12 corresponds to closing the ventilation valves to the autoclave 104 and storage tank 108 and opening the transfer valves between the autoclave 104 and storage tank 108. Step B in FIG. 12 occurs when the storage tank fluid level reaches the level corresponding to sensor CS3. Thereafter, a vacuum is pulled on the storage tank 108 in step C of FIG. 12. At this point process cycle returns to step A and another impregnation cycle can begin.

Figure 13:
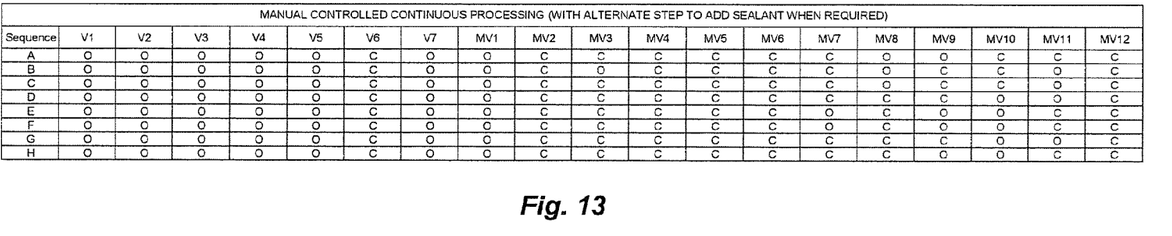
FIG. 13 is a valve state chart for manually controlling continuous sealant processing.

FIG. 13 depicts a valve state diagram for continuous processing of castings using a manual actuation of valves. During the manually controlled continuous processing, valves V1, V2, V3, V4, V5, V7, and MV1 are opened and valves V6, MV2, MV4, MV5, MV6, and MV12 are closed. As noted above, during the automatic process control, the sensors can be used as inputs to monitor fluid levels. During manual control, the sensors may be used to turn on indicator lights or other feedback mechanisms. In an alternative embodiment, area corresponding to the placement of the sensors may be used as view ports for a user to visually confirm the fluid level in the autoclave 104 and/or storage tank 108. The steps A-H of FIG. 13 generally correspond to steps A-H of FIG. 9 except that manual valves are used to complete the steps rather than automated valves.

Figure 14:
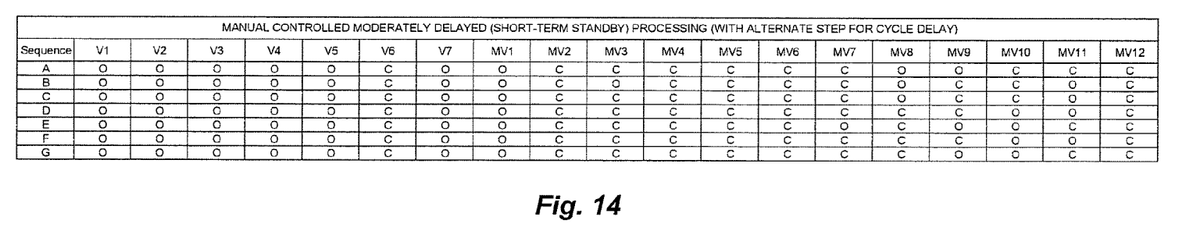
FIG. 14 is a valve state chart for manually controlling moderately delayed, short-term standby processing.

FIG. 14 depicts a valve state diagram for the process where a delay of moderate length is used between cycles. The valve state diagram of FIG. 14 corresponds to such a process that is manually controlled. Steps A-G of FIG. 14 generally coincide with steps A-G of FIG. 10 except that manual valves are used to complete the steps rather than automated valves.

Figures 15, 16:
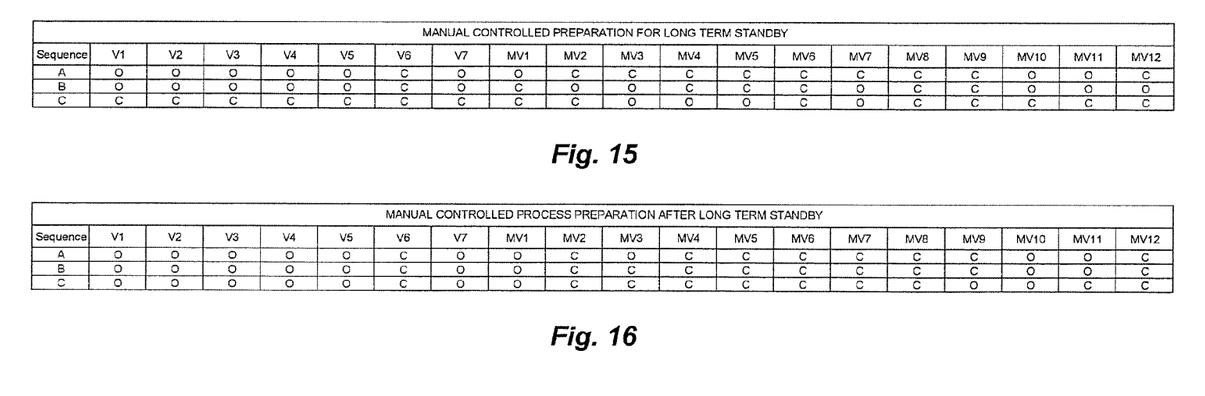
FIG. 15 is a valve state chart for manually preparing for long-term standby.
FIG. 16 is a valve state chart for manually resuming sealant processing after a long-term standby.

FIG. 15 depicts a valve state diagram in preparation for a long-term standby between impregnation cycles. The valve state diagram of FIG. 15 corresponds to such a process that is manually controlled. Steps A-C of FIG. 15 generally correspond to steps A-C of FIG. 11 with manual valves implementing the steps rather than automated valves.

FIG. 16 depicts a valve state diagram for preparing to begin an impregnation cycle after a long-term standby has been endured. The valve state diagram of FIG. 16 corresponds to a process that is manually controlled. Step A of FIG. 16 corresponds to step C of FIG. 12 where the manual valves implement the step rather than automated valves.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method of manufacturing a data storage device, comprising:
    pressurizing a first tank at a selected pressure, the first tank enclosing a housing component of a data storage device;
    pressurizing a second tank at substantially the same pressure as the first tank, the second tank fluidically coupled to the first tank and enclosing a sealant;
    gradually increasing said pressure of the second tank to induce and maintain a continuous laminar flow of the sealant from the second tank to the first tank, at least a portion of said sealant in the first tank contactingly permeating voids in the housing component; and
    transferring the sealant from the first tank back to the second tank by gradually increasing said pressure of the first tank to induce and maintain a continuous laminar flow of the sealant from the first tank to the second tank and to reduce introduction of gas bubbles in the sealant during the entirety of said transfer to the second tank.

2. The method of claim 1, wherein the selected pressure is a first pressure less than a standard air atmospheric pressure, and wherein the gradually increasing step comprises controllably increasing the pressure of the second tank to a second pressure greater than the first pressure to maintain said continuous laminar flow during the entirety of the transfer of the sealant from the second tank to the first tank.

3. The method of claim 1, wherein the transferring step sequentially comprises fluidically decoupling the first tank from the second tank, controllably increasing the pressure of the first tank to facilitate impregnation of the housing component by the sealant, fluidically recoupling the first tank to the second tank, and controllably reducing the pressure of the second tank so that a pressure differential between the first and second tanks induces and maintains said continuous laminar flow during the entirety of the transfer of the sealant from the first tank to the second tank.

4. The method of claim 1, wherein the gradually increasing step comprises flowing the sealant through a first filter as the sealant flows between the first and second tanks.

5. The method of claim 4, wherein the transferring step comprises flowing the sealant from the first tank back to the second tank through a second filter.

6. The method of claim 5, wherein the sealant flows during the gradually increasing step from the second tank to the first tank along a first path, wherein the sealant flows during the transferring step from the first tank back to the second tank along a second path, and wherein the respective first and second paths share a portion of conduit and then respectively split along two parallel conduits each having a respective one of the first and second filters.

7. The method of claim 1, wherein the housing component is characterized as a selected one of a base deck or a cover member configured to mate with the remaining one of the base deck or cover member to form a hermetically sealed data storage device housing which encloses a low density gas.

8. The method of claim 1, further comprising a step of immersing the housing component in the sealant for a predetermined period of time and at a selected pressure greater than standard atmospheric pressure after the gradually increasing step to induce said sealant permeation.

9. The method of claim 1, wherein the first tank is characterized as an autoclave, wherein the second tank is characterized as a sealant storage tank, and wherein a selectively openable conduit extends between the autoclave and the sealant storage tank configured to induce said laminar flow.

10. The method of claim 9, wherein the conduit is characterized as a first conduit, wherein a second conduit fluidically couples the autoclave to the sealant storage tank, and wherein the pressurizing a second tank step comprises facilitating fluidic flow along the second conduit to substantially equalize the pressure in the second tank to that of the first tank.

11. The method of claim 1, wherein the sealant comprises methacrylate.

12. A method of manufacturing a data storage device, comprising:
    sealing a pressurizable tank that encloses a housing component of a data storage device;
    introducing to the tank a sealant a portion of which contactingly permeates voids in the housing component;
    unsealing the tank to facilitate removal of said sealant-permeated housing component from the tank; and
    filtering the sealant after the sealing and introducing steps and prior to the unsealing step to remove particulate contamination from said sealant;
    wherein the pressurizable tank is characterized as a first tank, and wherein the method further comprises:
    pressurizing the first tank at a selected pressure, the first tank enclosing the housing component of the data storage device;
    pressurizing a second tank at substantially the same pressure as the first tank, the second tank fluidically coupled to the first tank and enclosing the sealant;
    gradually increasing said pressure of the second tank to induce and maintain a continuous laminar flow of the sealant from the second tank to the first tank, at least a portion of said sealant in the first tank contactingly permeating the voids in the housing component to thereby reduce permeability of the housing component to a low density gas; and
    transferring the sealant from the first tank back to the second tank by gradually increasing said pressure of the first tank to induce and maintain a continuous laminar flow of the sealant from the first tank to the second tank and to reduce introduction of gas bubbles in the sealant during the entirety of said transfer to the second tank.

13. The method of claim 12, wherein the selected pressure is a first pressure less than a standard air atmospheric pressure, and wherein the gradually increasing step comprises controllably increasing the pressure of the second tank to a second pressure greater than the first pressure to maintain said continuous laminar flow during the entirety of the transfer of the sealant from the second tank to the first tank.

14. The method of claim 12, wherein the transferring step sequentially comprises fluidically decoupling the first tank from the second tank, controllably increasing the pressure of the first tank to facilitate impregnation of the housing component by the sealant, fluidically recoupling the first tank to the second tank, and controllably reducing the pressure of the second tank so that a pressure differential between the first and second tanks induces and maintains said continuous laminar flow during the entirety of the transfer of the sealant from the first tank to the second tank.

* * * * *